United States Patent
Sumi et al.

(10) Patent No.: US 9,058,780 B2
(45) Date of Patent: Jun. 16, 2015

(54) 2D/3D SWITCHABLE AND TOUCH SENSITIVE DISPLAY AND METHOD FOR DRIVING THE SAME

(71) Applicant: INNOLUX CORPORATION, Chu-Nan, Miao-Li County (TW)

(72) Inventors: Naoki Sumi, Chu-Nan (TW); Kazuyuki Hashimoto, Chu-Nan (TW); Toshihiko Araki, Chu-Nan (TW); Satoru Takahashi, Chu-Nan (TW)

(73) Assignee: INNOLUX CORPORATION, Chu-Nan (TW)

( * ) Notice: Subject to any disclaimer, the term of this patent is extended or adjusted under 35 U.S.C. 154(b) by 118 days.

(21) Appl. No.: 13/791,572

(22) Filed: Mar. 8, 2013

(65) Prior Publication Data

US 2014/0253490 A1    Sep. 11, 2014

(51) Int. Cl.
*G09G 3/36* (2006.01)
*G06F 3/044* (2006.01)

(52) U.S. Cl.
CPC . *G09G 3/36* (2013.01); *G06F 3/044* (2013.01)

(58) Field of Classification Search
CPC ........... G09G 3/36; G06F 3/044; G06F 3/041; G02B 27/22; G02B 27/2214; G02B 27/225; G02B 27/2228; H04N 13/0402; H04N 13/0404; H04N 13/0409; H04N 13/0413; H04N 13/0225
USPC .............. 345/87, 173, 174; 349/15, 139, 143; 348/51, 54; 359/462
See application file for complete search history.

(56) References Cited

U.S. PATENT DOCUMENTS

| | | | |
|---|---|---|---|
| 8,217,913 B2 | 7/2012 | Hotelling et al. | |
| 8,243,027 B2 | 8/2012 | Hotelling et al. | |
| 2010/0328306 A1* | 12/2010 | Chau et al. | 345/419 |
| 2011/0109622 A1* | 5/2011 | Son et al. | 345/419 |
| 2012/0032913 A1* | 2/2012 | Shih et al. | 345/174 |
| 2012/0105434 A1* | 5/2012 | Kuo et al. | 345/419 |
| 2012/0169648 A1* | 7/2012 | Luo | 345/174 |
| 2012/0242615 A1* | 9/2012 | Teraguchi et al. | 345/174 |
| 2012/0327005 A1* | 12/2012 | Hamada et al. | 345/173 |
| 2013/0033440 A1* | 2/2013 | Cheng et al. | 345/173 |
| 2013/0155059 A1* | 6/2013 | Wang et al. | 345/419 |
| 2013/0162918 A1* | 6/2013 | Mayumi et al. | 349/12 |
| 2013/0271388 A1* | 10/2013 | Chu et al. | 345/173 |
| 2013/0308067 A1* | 11/2013 | Hashimoto | 349/15 |

* cited by examiner

*Primary Examiner* — Tom Sheng
(74) *Attorney, Agent, or Firm* — Liu & Liu

(57) ABSTRACT

A 2D/3D switchable and touch sensitive display, comprising a display panel with a plurality of pixels and a LC cell is disclosed. The LC cell is disposed on the display panel for providing 2D/3D switchable and touch sensitive function. The LC cell comprises a first substrate and a second substrate opposite to each other, a plurality of first electrodes disposed on the first substrate, a plurality of second electrodes disposed on the second substrate, and a liquid crystal layer disposed between the first electrodes and the second electrodes. The second electrodes interlaced with the first electrodes. The liquid crystal layer is controlled by a voltage between the first electrodes and the second electrodes for adjusting light path from the display panel and/or touch sensing.

18 Claims, 6 Drawing Sheets

2D/3D SWITCHABLE AND TOUCH SENSITIVE DISPLAY AND METHOD FOR DRIVING THE SAME

BACKGROUND OF THE INVENTION

1. Field of the Invention

The invention relates in general to a 2D/3D switchable display and method for driving the same, and more particularly to a touch sensitive 2D/3D switchable display and method for driving the same.

2. Description of the Related Art

As technology develops, a three-dimensional (3D) image display device capable of displaying an image in 3D is developed. A 3D image is generated by the principle of stereo vision of both eyes. The different images are received by individual eyes, merged by the brain and be developed into a stereoscopic image. Naked eye three dimensional (auto-stereoscopic) technology is produced so that viewers can watch the 3D images without wearing a three dimensional glasses. The main types of naked eye 3D display are lenticular lens type and parallax barrier type. By using switchable lenticular lens or switchable parallax barrier, a 2D/3D switchable display can be achieved so that viewers can optionally watch 2D or 3D images according to their preference.

Also, touch sensitive panel technologies are developed rapidly these years. The screens of a smart-phone and a tablet PC are integrated with a touch sensor for detecting touch information. However, the combination of the 3D and touch sensitive functions is difficult due to the manufacturing complexity and the problems of heaviness. Besides, a 2D/3D switchable display with an additional touch panel may be too thick to be accepted by the consumers.

SUMMARY

The invention is directed to a 2D/3D switchable and touch sensitive display and method for driving the same. The 2D/3D switchable and touch sensitive display having a LC cell disposed on the display panel for providing 2D/3D switchable and touch sensitive function.

According to a first aspect of the present invention, a 2D/3D switchable and touch sensitive display, comprising a display panel with a plurality of pixels and a LC cell is disclosed. The LC cell is disposed on the display panel for providing 2D/3D switchable and touch sensitive function. The LC cell comprises a first substrate and a second substrate opposite to each other, a plurality of first electrodes disposed on the first substrate, a plurality of second electrodes disposed on the second substrate, and a liquid crystal layer disposed between the first electrodes and the second electrodes. The second electrodes interlaced with the first electrodes. The liquid crystal layer is controlled by a voltage between the first electrodes and the second electrodes for adjusting light path from the display panel and/or touch sensing.

According to a second aspect of the present invention, a method for driving a 2D/3D switchable and touch sensitive display. The method comprises following steps. A display panel and a LC cell disposed on the display panel is provides. The LC cell comprises a first substrate and a second substrate opposite to each other. A plurality of first electrodes are disposed on the first substrate, a plurality of second electrodes are disposed on the second substrate and interlaced with the first electrodes, and a liquid crystal layer is disposed between the first electrodes and second electrodes. Each of the first electrodes comprises a plurality of conductive lines arranged in parallel, and the conductive lines in each first electrode are electrically connected with each other. A display panel displays an image. The LC cell is driven by providing a voltage between the first and second electrodes for controlling the liquid crystal layer to adjust a light path from the display panel and/or sensing a touch information.

The above and other aspects of the invention will become better understood with regard to the following detailed description of the preferred but non-limiting embodiment(s). The following description is made with reference to the accompanying drawings.

DETAILED DESCRIPTION

Figure 1:
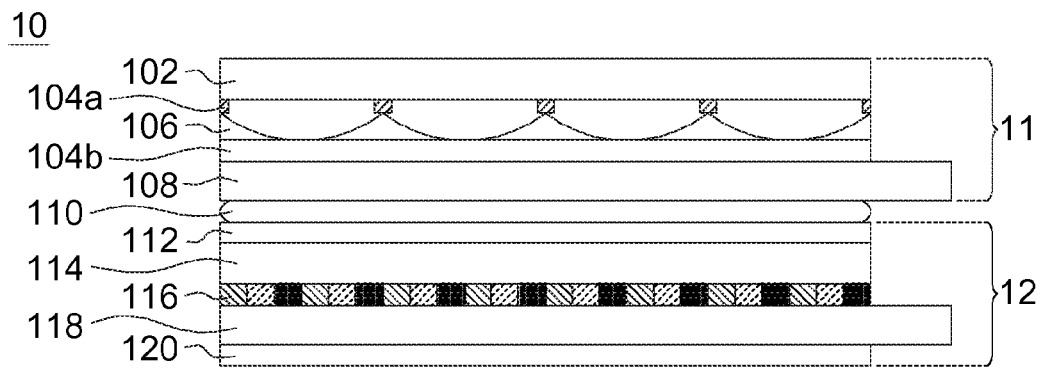
FIG. 1 illustrates a cross section view of a 2D/3D switchable and touch sensitive display according one embodiment of the invention.

FIG. 1 illustrates a cross section view of a 2D/3D switchable and touch sensitive display 10 according one embodiment of the invention. Referring to FIG. 1, a 2D/3D switchable and touch sensitive display 10 comprises a liquid crystal (LC) cell 11 and a display panel 12. The LC cell 11 disposed on the display panel 12 comprises a first substrate 102, a first electrode layer 104a, a liquid crystal layer 106, a second electrode layer 104b and a second substrate 108 opposite to the first substrate 102. The LC cell 11 may comprise additional optical function layer, like polarizer or phase retarder, between the observer and the liquid crystal layer 106 for modulating the light transmittance or phase. The LC cell 11 for example is a passively driven type or active driven type switchable lens or switchable barrier. The material of the first substrate 102 and the second substrate 108 could be glass, plastic or other transparent organic polymers. The material of the first electrode layer 104a and the second electrode layer 104b could be transparent conductive metal oxide (ITO, IZO), metal or alloy.

The first electrode layer 104a comprises a plurality of first electrodes disposed on the first substrate 102, and a second electrode layer 104b comprises a plurality of second electrodes disposed on the second substrate 108. The second electrodes are interlaced with the first electrodes. The liquid crystal layer 106 is disposed between the first substrate 102 and second substrate 108. Actually, the liquid crystal layer 106 is disposed between the first electrode layer 104a and the second electrode layer 104b. The liquid crystal layer 106 is controlled by a voltage difference between the first electrode layer 104a and the second electrode layer 104b for adjusting the path or phase while a light passing through the display panel 12. Additionally, the lamination of the first substrate 102 and the second substrate 108 could be misplaced to expose the first electrode layer 104a (down) and the second electrode layer 104b (up) for bonding from two interlace directions.

In this embodiment, the 2D/3D switchable and touch sensitive display 10 can display a two view 3D image, since a gap between two adjacent first electrodes of the first electrode layer 104a corresponds to two pixels (unit dot of image) of the display panel 12 and the two pixels playing two images with parallax. In other embodiments, the 2D/3D switchable and touch sensitive display 10 can also be a multi-view display when displaying a plurality of images with parallax if a gap between two adjacent first electrodes corresponds to more pixels. The pitch of two adjacent first electrodes corresponding to at least two pixels of the display panel 12. The better choice of the pitch is corresponded to even number of pixels.

The display panel 12 such as a LCD or an organic light-emitting diode (OLED) is used for displaying and providing an image. If the display panel 12 is a LCD, then it can comprises polarizer 112, substrate 114, color filter (CF) and thin-film transistor (TFT) 116, substrate 118, polarizer 120 and liquid crystal (not shown in FIG. 1). The structure of the invention is not limited thereto. The display panel 12 can be assembly and fixed with the LC cell 11 by glue 110 or other adhesives.

Figure 2A:
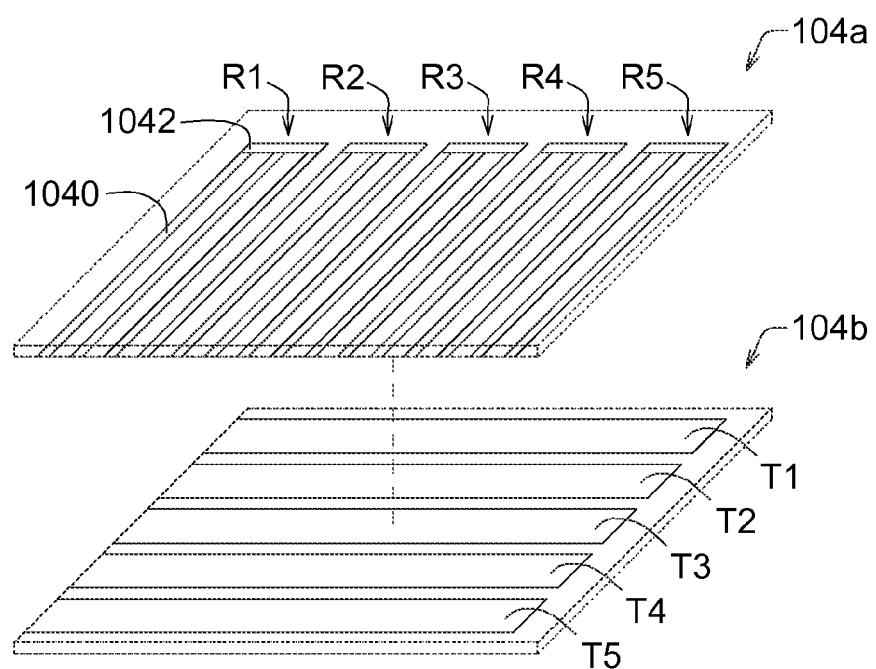
FIG. 2A illustrates a diagram of electrode layers in a 2D/3D switchable and touch sensitive display according one embodiment of the invention.

FIG. 2A illustrates a diagram of electrode layers in a 2D/3D switchable and touch sensitive display 10 according one embodiment of the invention. Referring to FIG. 2A, the first electrode layer 104a can comprises a plurality of first electrodes R1, R2, R3, R4 and R5. Each of the first electrodes R1~R5 comprises a plurality of conductive lines 1040 arranged in parallel, and the conductive lines 1040 in each first electrode R1~R5 are electrically connected with each other in a group by a conductive pad 1042 at an end of the conductive line 1040. The number of the first electrodes and the conductive lines depends on driving ability of IC, driving scheme of sensing process, RC loading, and 3D function.

The second electrodes T1, T2, T3, T4 and T5 are horizontal stripe electrodes. The conductive lines 1040 of the first electrodes R1~R5 are substantially vertical to the second electrodes T1~T5. A width of the conductive line 1040 is smaller than a width of one of the second electrodes T1~T5. In FIG. 2A, merely five first electrodes and five second electrodes are illustrated to simplified the structure for sake of clarity, and the invention is not limited thereto.

In one embodiment for displaying an image with HD 720 resolution, a number of first electrodes can be 20 and each first electrode comprises 32 conductive lines 1040. Besides, a number of the second electrodes can be 12. In this case, the touch sensor electrodes arrange in a M by N matrix, M for example is 20 and N for example is 12. The number of the first electrodes and the second electrodes are adjustable according to the size, the resolution and the sensitivity of the 2D/3D switchable and touch sensitive display 10.

Each pair of the first electrode and the second electrode separated by a dielectric layer (liquid crystal layer 106) for forming a capacitance called touch sensitive unit. Several touch sensitive units form a touch sensitive screen. While a charge disturbance of the electrode, the change can be detected and transfer to a touch signal. In one embodiment, the first electrodes R1~R5 can be used as receivers of a touch sensor and the second electrodes T1~T5 can be used as transmitters of the touch sensor, and the invention is not limited thereto. In other embodiment, the first electrodes R1~R5 can be used as transmitters of a touch sensor and the second electrodes T1~T5 can be used as receivers of the touch sensor. Each first electrode R1~R5 or each second electrode T1~T5 can be driven sequentially for sensing a touch information. Moreover, the conductive lines 1040 of the first electrodes R1~R5 or the second electrodes T1~T5 can be driven at the same time to form a switchable barrier or a switchable lens for adjusting a light path of light transmitting from the display panel.

Figure 2B:
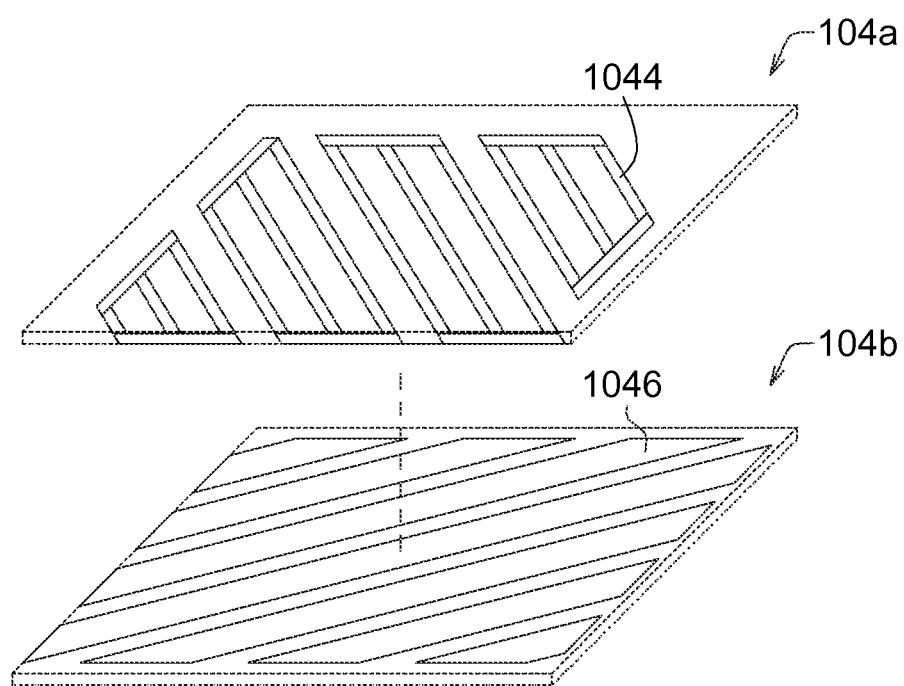
FIGS. 2B~2C shows diagrams of electrode layers in a 2D/3D switchable and touch sensitive display according other embodiments of the invention.
Figure 2C:
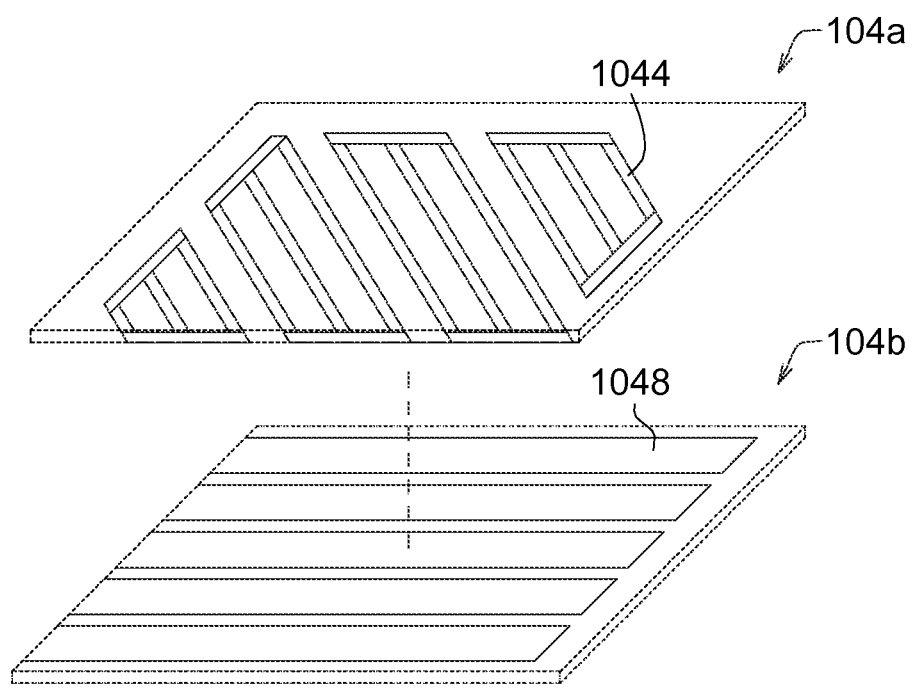

FIGS. 2B~2C shows diagrams of electrode layers in a 2D/3D switchable and touch sensitive display 10 according other embodiments of the invention. Referring to FIG. 2B, the conductive lines 1044 of the first electrode layer 104a are substantially parallel to each other, and the conductive lines 1044 of the first electrode layer 104a are orthogonal to the second electrodes 1046. Referring to FIG. 2C, the conductive lines 1044 of the first electrode layer 104a are substantially parallel to each other, conductive lines 1044 of the first electrode layer 104a are slant to the second electrodes 1048. The arrangements of the electrodes are so-called a slant lens design and can reduce the 3D moiré and solve the color shift issue by misalignment with the pixel alignment of the display panel 12.

The 2D/3D switchable and touch sensitive display 10 can be driven by different signals in various embodiments of the invention. The driving method of the 2D/3D switchable and touch sensitive display 10 are described as follows.

First Embodiment

Figure 3A:
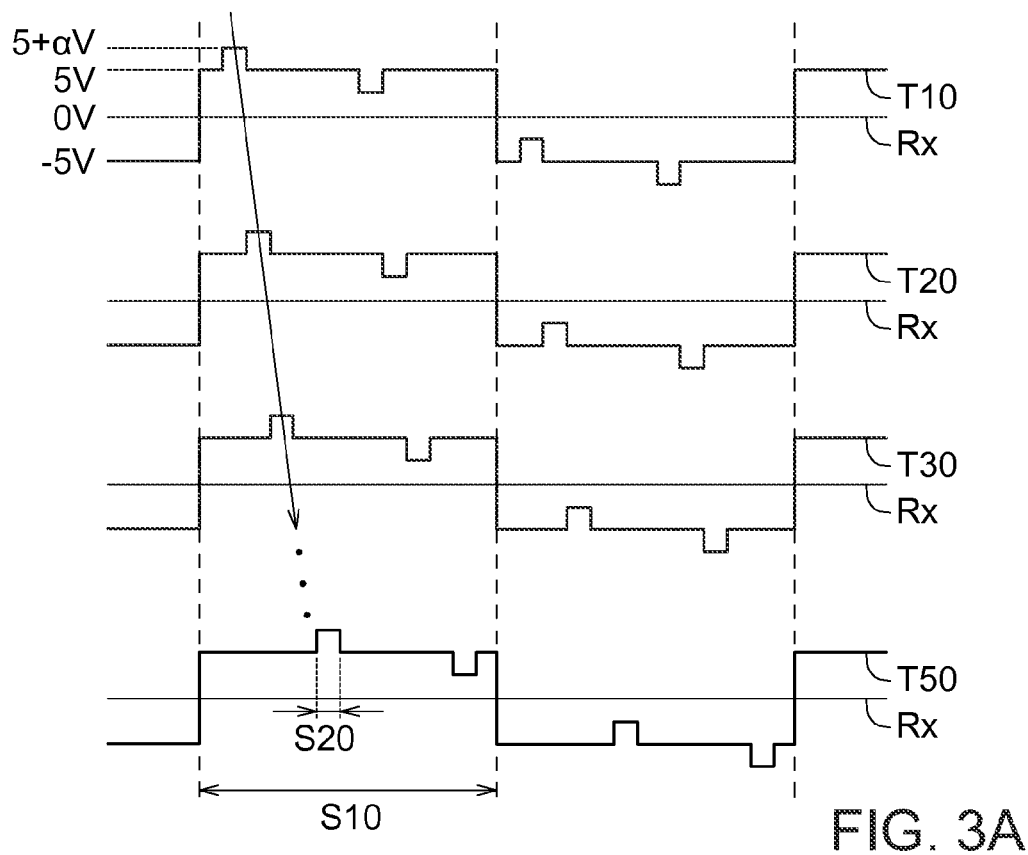
FIG. 3A illustrates a waveform diagram of driving signals for driving a 2D/3D switchable and touch sensitive display in a 3D mode according to an embodiment of the invention.

FIG. 3A illustrates a waveform diagram of driving signals for driving a 2D/3D switchable and touch sensitive display in a 3D mode according to an embodiment of the invention. Referring to FIGS. 2A and 3A, a DC signal Rx (such as 0V) is inputted to the first electrodes R1~R5, and alternative signals (AC) T10, T20, T30 . . . T50 with the same duty cycle are respectively inputted to the second electrodes T1~T5. The DC signal Rx inputted synchronous (in phase) to the first electrodes R1~R5 and the alternative signals T10, T20, T30 . . . T50 inputted synchronous (in phase) to the second electrodes T1~T5. The alternative signals are pulse (or square, sine) signals. The numbers of the DC signal Rx and that of the alternative signals T10, T20, T30 . . . T50 correspond to the numbers of the second and first electrodes.

Each of the alternative signals T10, T20 T30 . . . T50 can be a superposition of a first signal S10 and a second signal S20. The first signals S10 are pulse (or square, sine) signals and the voltage difference is between the amplitude difference (modulus) of the first signals S10 and the DC signals. In a 3D mode, the first signal S10 can have amplitude of ±5V, with the same duty cycle, and synchronous (in phase) in a frequency of 60 Hz to switch on the liquid crystal layer 106 (shown in FIG. 1) for producing the switchable lens and switchable barrier, so that the 2D/3D switchable and touch sensitive display 10 can display 3D images. Besides, the second signal S20 (or square, sine) can have an amplitude of ±αV, with the same duty cycle, and sequentially in a frequency of 120 Hz for touch sensing, and α is much less than 5. In addition, the modulus of the first signals S10 and the second signals S20 are positive integer, and the modulus of the first signals S10 are larger than that of the second signals S20. The doubled frequency of the second signals S20 in a frame (a pulse of the first signals) using a pair of a positive signal and a negative signal for reducing the disturbing switchable lens or switchable barrier function. The second signals S20 are separated from each other for touch sensing.

As shown in FIG. 3A, the alternative signals T10, T20 and T30 . . . T50 have a period of 16.7 ms. The second electrodes T1~T5 driven by the first signal S10 having the same period with the alternative signals T10, T20 and T30 . . . T50 can control the liquid crystal layer 106 to form a switchable lens or a switchable barrier. The second electrodes T1~Tn are sequentially driven by the second signals S20 with short period such as 2-3 μs and the first electrodes R1~R5 are biased with DC voltage source, and the DC-biased first electrodes R1~R5 can receive small voltage changes by finger touch.

Figure 3B:
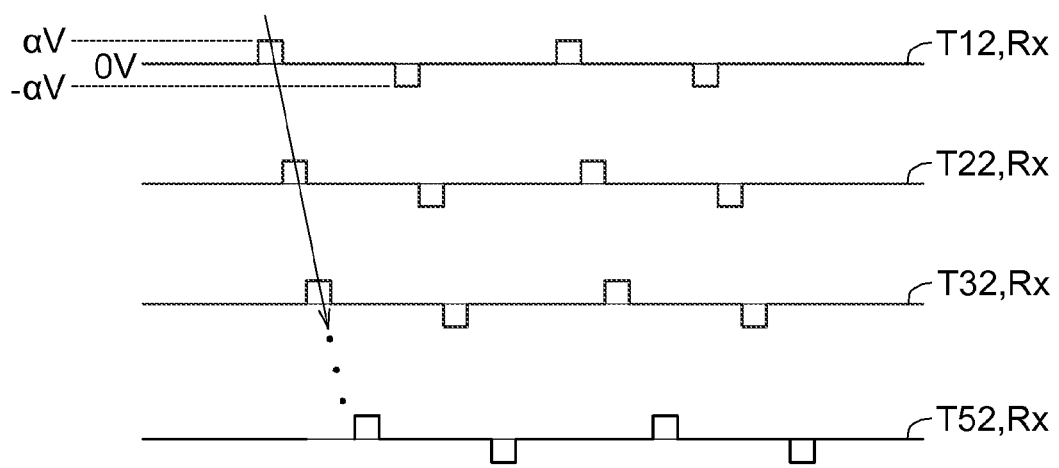
FIG. 3B illustrates a waveform diagram of driving signals for driving a 2D/3D switchable and touch sensitive display in a 2D mode according to an embodiment of the invention.

FIG. 3B illustrates a waveform diagram of driving signals for driving a 2D/3D switchable and touch sensitive display in a 2D mode according to an embodiment of the invention. Referring to FIGS. 2A and 3B, a DC signal Rx (such as 0V) is inputted to the first electrodes R1~R5, and alternative signals T12, T22, T32 . . . T52 are respectively inputted to the second electrodes T1~T5. The DC signal Rx and the alternative signals T12, T22 and T32 . . . T52 are interchangeable.

Each of the alternative signals T12, T22 and T32 can be a superposition of a first signal S10 and a second signal S20. In a 2D mode, the first signal S10 can have amplitude of 0V (less than the threshold voltage of the liquid crystal layer 106 and more than or equal to 0V) so that the switchable lens and switchable barrier are switched off to display 2D images. Besides, a second signals S20 can have an amplitude of ±αV and a frequency of 120 Hz, the waveforms of the second signals S20 in 2D and 3D modes are the same. In other embodiment, the frequency of the second signals can be reduced to 60 Hz, since a number of interlaced positive and negative second signals S20 in 2D mode can be reduced to half of the number of that in 3D mode, for disturbing the functions of switchable lens or switchable barrier. As shown in FIGS. 2A and 3B, the second electrodes T1~T5 are sequentially driven by the alternative signals T12, T22, T32 . . . T52 with short period such as 2-3 μs and the first electrodes R1~R5 are biased with DC voltage source, and the first electrodes R1~R5 can receive small voltage changes by finger touch.

Second Embodiment

Figure 4A:
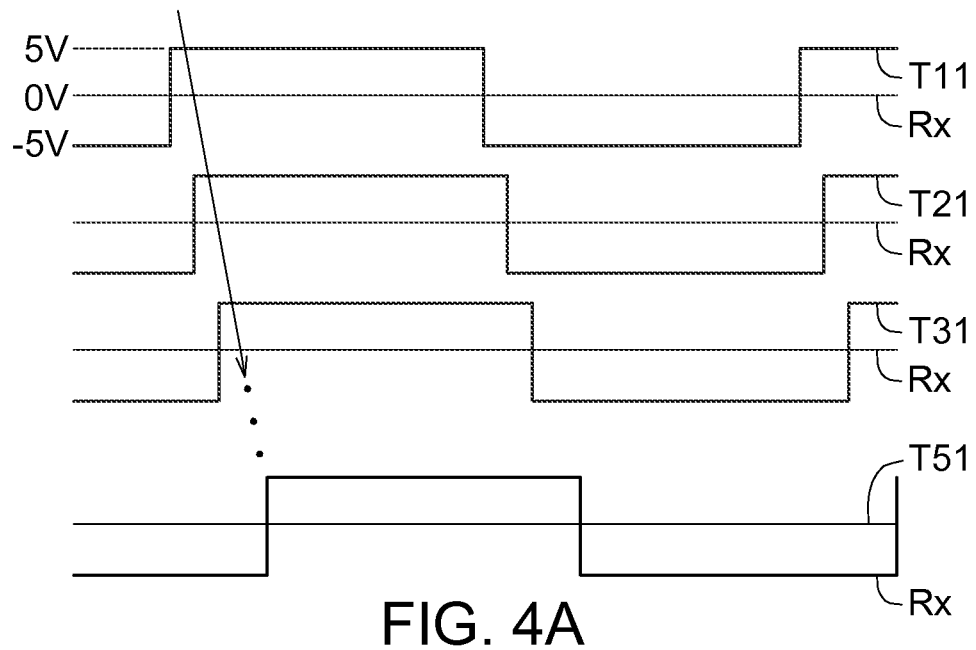
FIG. 4A illustrates a waveform diagram of driving signals for driving a 2D/3D switchable and touch sensitive display in a 3D mode according to another embodiment of the invention.

FIG. 4A illustrates a waveform diagram of driving signals for driving a 2D/3D switchable and touch sensitive display in a 3D mode according to another embodiment of the invention. Referring to FIGS. 2A and 4A, a DC signal Rx (such as 0V) is inputted to the first electrodes R1~R5, and alternative signals T11, T21, T31 . . . T51 are respectively inputted to the second electrodes T1~T5. The DC signal Rx inputted to the first electrodes R1~R5 and the alternative signals T11, T21 and T31 . . . T51 respectively inputted to the second electrodes T1~T5 are interchangeable.

Figure 4B:
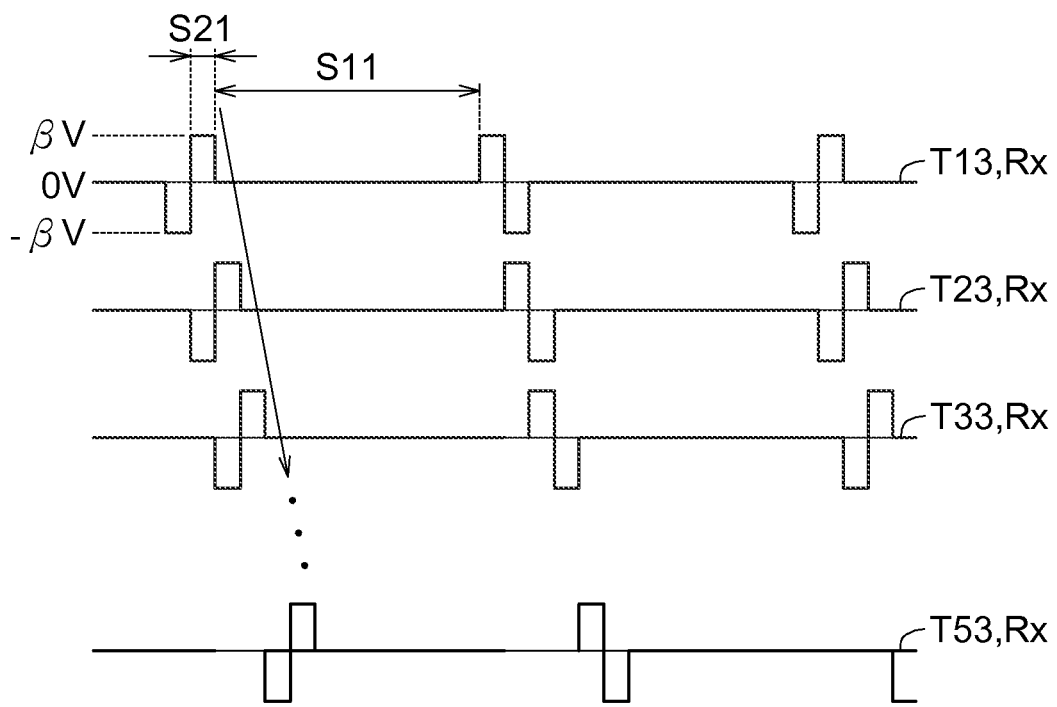
FIG. 4B illustrates a waveform diagram of driving signals for driving a 2D/3D switchable and touch sensitive display in a 2D mode according to another embodiment of the invention.

In a 3D mode, the alternative signals (square, pulse or sine wave) T11, T21 and T31 . . . T51 can be a superposition of a first signal S11 (the position and half cycle of first signal S11 is illustrated in FIG. 4B) and a second signal S21 (illustrated in FIG. 4B). The alternative signals T11, T21 and T31 . . . T51 have an amplitude of ±5V, a frequency of 60 Hz and the same duty cycle, so that the switchable lens and switchable barrier are switched on to display 3D images. Besides, the second electrodes T1~T5 are sequentially driven by the alternative signals T11, T21 and T31 . . . T51 and the first electrodes R1~R5 are biased with DC voltage source, the DC-biased first electrodes R1~R5 can receive small voltage changes by finger touch. The waveform patterns of the DC signals Rx and the alternative signals T11, T21 and T31 . . . T51 applied to the first and second electrodes can be utilized to both form the switchable barrier or the switchable lens and detect touch information. The alternative signals T11, T21 and T31 . . . T51 are arranged with a shift to each other (non-synchronous).

FIG. 4B illustrates a waveform diagram of driving signals for driving a 2D/3D switchable and touch sensitive display in a 2D mode according to an embodiment of the invention. Referring to FIGS. 2A and 4B, a DC signal Rx (such as 0V) is inputted to the first electrodes R1~R5, and alternative signals T12, T22 and T32 are respectively inputted to the second electrodes T1~T5. The DC signal Rx and the alternative signals T13, T23, T33 . . . T53 are interchangeable.

In a 2D mode, the first signals S11 having an amplitude of 5V is turned off to switch off the switchable lens and switchable barrier so that the 2D/3D switchable so that the touch sensitive display 10 can display 2D images. Besides, second signals S21 having an amplitude of ±βV (such as ±5V) and a frequency of 60 Hz (square, pulse or sine wave) can be applied to the second electrodes T1~T5. As shown in FIGS. 2A and 4B, the second electrodes T1~T5 sequentially driven by the another first signals T13, T23, T33 . . . T53 with short period such as 2-3 μs, and the first electrodes R1~R5 are biased with DC voltage source to receive small voltage changes by finger touch. In this embodiment, the modulus of the alternative signals and the β are the same (positive integer).

Third Embodiment

Figure 5A:
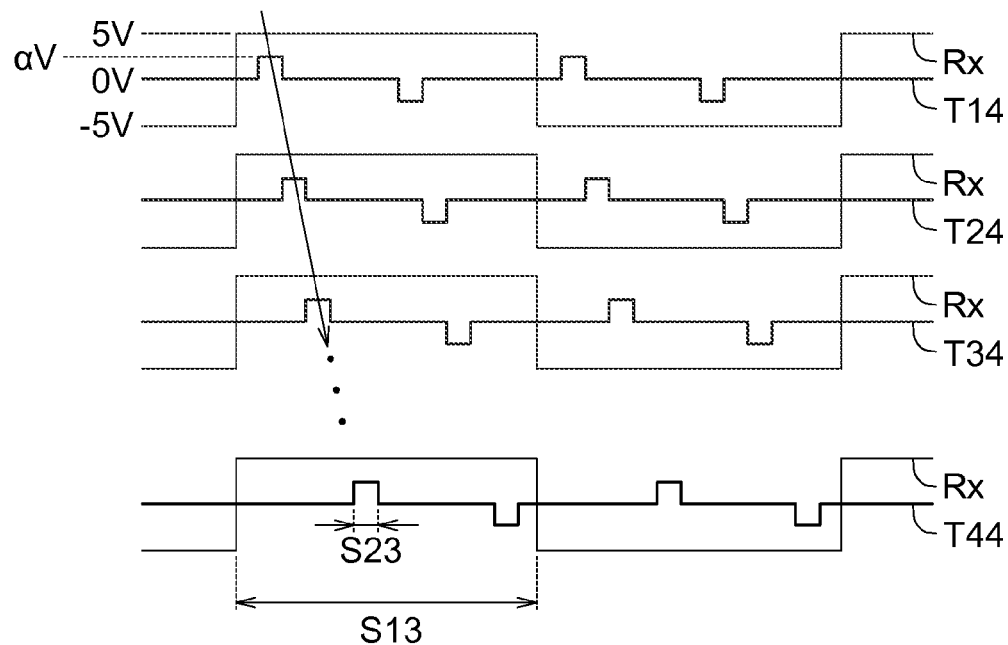
FIG. 5A illustrates a waveform diagram of driving signals for driving a 2D/3D switchable and touch sensitive display in a 3D mode according to still another embodiment of the invention.

FIG. 5A illustrates a waveform diagram of driving signals for driving a 2D/3D switchable and touch sensitive display in a 3D mode according to an embodiment of the invention. Referring to FIGS. 2A and 5A, alternative signals Rx comprise first signals S13 is inputted to the first electrodes R1~R5, and another alternative signals T14, T24, T34 . . . T54 comprise second signals S13 with the same duty cycle are sequentially inputted to the second electrodes T1~T5. The alternative signals Rx inputted to the first electrodes R1~R5 and the another alternative signals T14, T24, T34 . . . T54 respectively inputted to the second electrodes T1~T5 are interchangeable.

In a 3D mode, the alternative signals Rx can have amplitude of ±5V and a frequency of 60 Hz, and the switchable lens and switchable barrier are switched on so that the 2D/3D switchable and touch sensitive display 10 can display 3D images. Besides, another alternative signals T14, T24, T34 . . . T54 with the same duty cycle can have an amplitude of ±αV and a frequency of 120 Hz, and α is much less than 5. The alternative signals Rx can have a period of 16.7 ms. (the definition of α is the same with that in embodiment 1)

The first electrodes R1~R5 driven by the alternative signals Rx (first signal S13) can control the liquid crystal layer 106 to form a switchable lens or a switchable barrier. The second electrodes T1~T5 are sequentially driven by the another alternative signals T14, T24, T34 . . . T54 (second signal S13) with short period such as 2-3 μs, and the first electrodes R1~R5 can be connected to an input end of an Operational Amplifier (Op-Amp) and be virtually biased with DC voltage source to cancel the LC driving voltage impact. The virtually DC-biased first electrodes R1~R5 can receive small voltage changes induced by finger touch.

Figure 5B:
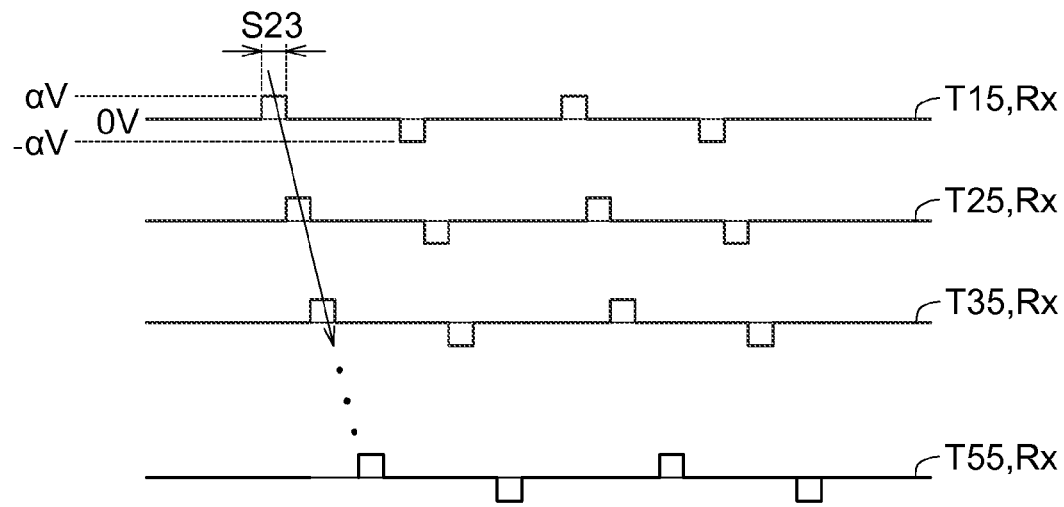
FIG. 5B illustrates a waveform diagram of driving signals for driving a 2D/3D switchable and touch sensitive display in a 2D mode according to still another embodiment of the invention.

FIG. 5B illustrates a waveform diagram of driving signals for driving a 2D/3D switchable and touch sensitive display in a 2D mode according to an embodiment of the invention. Referring to FIGS. 2A and 5B, a DC signal Rx (such as 0V) is inputted to the first electrodes R1~R5, and second signals T15, T25, T35 . . . T55 are sequentially and respectively inputted to the second electrodes T1~T5. The DC signal Rx and the second signals T15, T25 and T35 . . . T55 are interchangeable.

In a 2D mode, the switchable lens and switchable barrier are switched off (first signal S13 is turned off) so that the 2D/3D switchable and touch sensitive display 10 can display 2D images. Besides, the second signals can have an amplitude of $\pm\alpha V$ and a frequency of 120 Hz can be inputted to the second electrodes T1~T5. The second electrodes T1~T5 sequentially driven by the another alternative signals T15, T25 and T35 . . . T55 (second signals S23) with short period such as 2-3 μs, and the first electrodes R1~R5 are biased with DC voltage source to receive small voltage changes induced by finger touch. In other embodiment, the frequency of the second signals can be reduced to 60 Hz, since a number of interlace positive and negative second signals S23 in 2D mode can be reduced to half of the number of that in 3D mode, for disturbing the functions of switchable lens or switchable barrier function.

Figure 6:
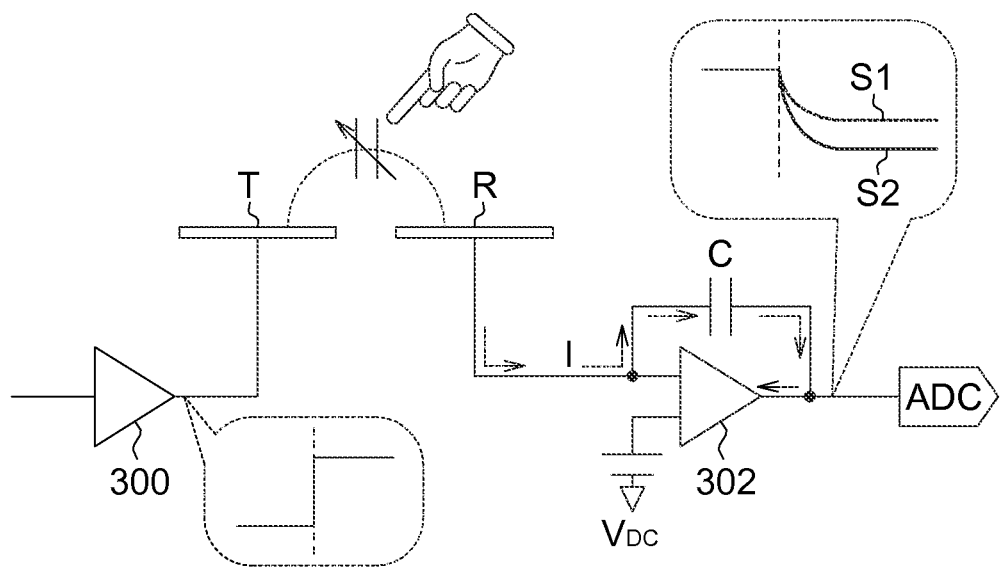
FIG. 6 illustrates a simplified equivalent circuit of a 2D/3D switchable and touch sensitive display according to an embodiment of the invention.

FIG. 6 illustrates a simplified equivalent circuit of a simplified 2D/3D switchable and touch sensitive display according to an embodiment of the invention. As shown in FIG. 6, the equivalent circuit comprises a buffer to provide a voltage source for driving a transmitter electrode T with a step voltage. A mutual capacitance between the transmitter electrode T and the receiver electrode R can be measured for touch detecting.

The receiver electrode R is connected to an Operational Amplifier (Op-Amp) 302 so that current from the receiver electrode R passes through an Op-Amp. The Op-Amp 302 coupling with a capacitance C is used as charge integrator. Since the charge received by the charge integrator can be converted to a voltage signal, a detected touch signal S1 and an untouched signal S2 can be distinguished. Then, the detected touch signal S1 and an untouched signal S2 can be digitized by an analog-to-digital converter (ADC) element for signal processing in MPU. In this circuit, since the receiver electrode R is virtually connected to a DC bias voltage source (can be virtual ground) of the charge integrator, the LC driving voltage impact can be canceled and the receiver electrode R can receive small voltage change by finger touch.

Based on the above, the embodiments of the invention provide a 2D/3D switchable and touch sensitive display. The 2D/3D switchable and touch sensitive display combines the 2D/3D switchable techniques and touch sensing techniques together and integrates electrodes for controlling the liquid crystal layer to form a 2D/3D switchable lens (or barrier) and electrodes for touch sensing in one liquid crystal cell. The 2D/3D switchable and touch sensitive display has advantages such as thin size, light weight, low cost and simple manufacturing procedure. Besides, the 2D/3D switchable and touch sensitive display can be manufactured simply and without additional photo-mask process by using the electrodes as the receiver and transmitter of a touch sensor and as a switch for LC lens (or barrier) control.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A 2D/3D switchable and touch sensitive display, comprising:
   a display panel with a plurality of pixels, wherein the display panel comprises a LCD or an OLED; and
   a LC cell disposed on the display panel for providing 2D/3D switchable and touch sensitive function, comprising:
      a first substrate and a second substrate opposite to each other;
      a plurality of first electrodes disposed on the first substrate, wherein the first electrodes are receivers of a touch sensor;
      a plurality of second electrodes disposed on the second substrate, the second electrodes interlaced with the first electrodes, wherein the second electrodes are transmitters of the touch sensor; and
      a liquid crystal layer disposed between the first electrodes and the second electrodes, wherein the liquid crystal layer is controlled by a voltage between the first electrodes and the second electrodes for adjusting light path from the display panel and/or touch sensing.

2. The 2D/3D switchable and touch sensitive display according to claim 1, wherein each of the first electrodes comprises a plurality of conductive lines arranged in parallel, and the conductive lines in each first electrode are electrically connected with each other.

3. The 2D/3D switchable and touch sensitive display according to claim 1, wherein the first electrodes are substantially orthogonal to the second electrodes.

4. The 2D/3D switchable and touch sensitive display according to claim 1, wherein a pitch of two adjacent first electrodes corresponds to at least two of the pixels of the display panel.

5. The 2D/3D switchable and touch sensitive display according to claim 1, wherein a DC signal is inputted into the first electrodes, and a plurality of first signals with a first amplitude are inputted to the second electrodes synchronously to control the liquid crystal layer for 2D/3D displaying, wherein the first amplitude is alternated with a first frequency.

6. The 2D/3D switchable and touch sensitive display according to claim 5, wherein the first amplitude in 3D mode is larger than the first amplitude in 2D mode, the first amplitude in 2D mode is lower than a modulus of the threshold voltage of the liquid crystal layer and larger than or equal to 0.

7. The 2D/3D switchable and touch sensitive display according to claim 5, wherein a plurality of second signals with a second amplitude are sequentially inputted into the second electrodes for touch sensing, the second amplitude is alternated with a second frequency, the first amplitude is larger than or equal to the second amplitude, and the second frequency is larger than or equal to the first frequency.

8. The 2D/3D switchable and touch sensitive display according to claim 7, wherein the second signals with the same duty cycle are separated from each other.

9. The 2D/3D switchable and touch sensitive display according to claim 7, wherein a sum of the second amplitude of a pair of the second signals within one of the first signal is equal to the first amplitude.

10. The 2D/3D switchable and touch sensitive display according to claim 5, wherein a plurality of second signals with a second amplitude are sequentially inputted into the first electrodes for touch sensing, the second amplitude is alternated with a second frequency, the first amplitude is larger than or equal to the second amplitude, and the second frequency is larger than or equal to the first frequency.

11. The 2D/3D switchable and touch sensitive display according to claim 10, wherein the second signals with the same duty cycle are separated from each other.

12. The 2D/3D switchable and touch sensitive display according to claim 10, wherein the a sum of the second amplitude of a pair of the second signals within one of the first signal is equal to the first amplitude.

13. The 2D/3D switchable and touch sensitive display according to claim 1, wherein a DC signal is inputted into the first electrodes, and a plurality of first signals with a first amplitude is inputted to the second electrodes sequentially to control the liquid crystal layer for 2D/3D displaying and touch sensing, wherein the first amplitude is alternated with a first frequency.

14. The 2D/3D switchable and touch sensitive display according to claim 13, wherein the first signals are switched to a plurality of second signals with a second frequency, the second frequency is less than the first frequency, a sum of the second amplitude of two sequential signals of the second signals is lower than a modulus of a threshold voltage of the liquid crystal layer and is larger than or equal to 0.

15. The 2D/3D switchable and touch sensitive display according to claim 14, wherein the second signals with the same duty cycle are separated to each other.

16. A method for driving a 2D/3D switchable and touch sensitive display, comprising:
providing a display panel and a LC cell disposed on the display panel, the LC cell comprising a first substrate and a second substrate opposite to each other, a plurality of first electrodes disposed on the first substrate, a plurality of second electrodes disposed on the second substrate and interlaced with the first electrodes, and a liquid crystal layer disposed between the first electrodes and second electrodes, each of the first electrodes comprises a plurality of conductive lines arranged in parallel, and the conductive lines in each of the first electrode are electrically connected with each other, wherein the display panel comprises a LCD or an OLED, and the first electrodes are receivers of a touch sensor and the second electrodes are transmitters of the touch sensor;
displaying an image by a display panel; and
driving the LC cell by providing a voltage between the first and second electrodes for controlling the liquid crystal layer to adjust a light path from the display panel and/or sensing a touch information.

17. The method for driving the 2D/3D switchable and touch sensitive display according to claim 16, wherein the step of driving the LC cell comprises:
providing a plurality of first signals having a first frequency to the second electrodes synchronously;
providing a plurality of second signals having a second frequency to the second electrodes sequentially, wherein the second frequency is larger than the first frequency; and
providing a DC signal to the first electrodes to control the liquid crystal layer between the first electrodes and the second electrodes for 2D/3D displaying and/or touch sensing.

18. The method for driving the 2D/3D switchable and touch sensitive display according to claim 16, wherein the step of driving the LC cell comprises:
providing a plurality of first signals having a first frequency to the second electrodes sequentially; and
providing a DC signal to the first electrodes to control the liquid crystal layer between the first electrodes and the second electrodes for 2D/3D displaying and/or touch sensing.

* * * * *